(12) United States Patent
Kassubek et al.

(10) Patent No.: US 7,730,792 B2
(45) Date of Patent: Jun. 8, 2010

(54) METHOD AND DEVICE FOR COMPENSATION FOR INFLUENCES, WHICH INTERFERE WITH THE MEASUREMENT ACCURACY, IN MEASUREMENT DEVICES OF THE VIBRATION TYPE

(75) Inventors: Frank Kassubek, Rheinfelden (DE); Lothar Deppe, Göttingen (DE); Jörg Gebhardt, Mainz (DE); René Friedrichs, Rosdorf (DE); Steffen Keller, Constance (DE)

(73) Assignee: ABB Patent GmbH, Ladenburg (DE)

( * ) Notice: Subject to any disclaimer, the term of this patent is extended or adjusted under 35 U.S.C. 154(b) by 205 days.

(21) Appl. No.: 12/000,862

(22) Filed: Dec. 18, 2007

(65) Prior Publication Data

US 2008/0141789 A1 Jun. 19, 2008

(30) Foreign Application Priority Data

Dec. 18, 2006 (DE) ........................ 10 2006 059 754

(51) Int. Cl.
*G01F 1/84* (2006.01)
(52) U.S. Cl. ................................................. 73/861.355
(58) Field of Classification Search ............ 73/861.355, 73/861.356, 861.357, 861.18, 23, 27; 702/25, 702/45
See application file for complete search history.

(56) References Cited

U.S. PATENT DOCUMENTS 6,889,561 B2 * 5/2005 Hussain et al. ......... 73/861.357
7,474,966 B2 * 1/2009 Fernald et al. ................ 702/25

* cited by examiner

*Primary Examiner*—Jewel Thompson
(74) *Attorney, Agent, or Firm*—Buchanan Ingersoll & Rooney PC

(57) ABSTRACT

A method for compensation for influences, which interfere with the measurement accuracy, in measurement devices of the vibration type, comprising a measurement tube through which a fluid medium can flow and which is caused to oscillate mechanically, acting as an oscillation body, by an excitation unit, whose oscillation behavior, which changes as a function of the flowrate and/or the viscosity and/or the density of the fluid medium, is detected by at least one oscillation sensor in order to determine the flowrate, wherein the material strain in the measurement tube is detected by means of at least one sensor, from which an indicator value for the influence causing the material strain is calculated in order to correct the measurement signal, by signal processing, from the indicator value obtained in this way.

29 Claims, 2 Drawing Sheets

METHOD AND DEVICE FOR COMPENSATION FOR INFLUENCES, WHICH INTERFERE WITH THE MEASUREMENT ACCURACY, IN MEASUREMENT DEVICES OF THE VIBRATION TYPE

FIELD OF THE INVENTION

The present invention relates to a device and a method for compensation for influences, which interfere with the measurement accuracy, in measurement devices of the vibration type, comprising a measurement tube through which a fluid medium can flow and which is caused to oscillate mechanically, acting as an oscillation body, by an excitation unit, whose oscillation behavior, which changes as a function of the flowrate, is detected by at least one oscillation sensor in order to determine the flowrate.

The present invention also relates to a measurement device of the vibration type, having at least one measurement tube, through which a fluid medium can flow and which can be caused to oscillate mechanically by means of an excitation unit, as an oscillation body, whose oscillation behavior, which changes as a function of the flowrate of the fluid medium, can be detected by at least one sensor in order to determine the flowrate of the fluid, and having a device for compensation for influences which interfere with the measurement accuracy.

BACKGROUND OF THE INVENTION

Measurement devices of the vibration type are also known as Coriolis flowmeters and are used to measure fluid mass flowrates mechanically, and are applied in installations in which the precision of the mass flow is relevant, for example in refineries. Measurement devices of the vibration type can also be used to measure the viscosity and 7 or the density of the fluid flowing through the measurement tube.

DE 103 56 383 A1 discloses a Coriolis mass flowmeter of this generic type which essentially comprises an inlet flange and an outlet flange which produce the connection between the inlet and outlet pipe limbs and external inlet and outlet pipes. A measurement tube connects the inlet and outlet pipe limb, so as to form the shape of a Greek letter Ω. This shape is distinguished by a good oscillation behavior. In addition, embodiments with duplicated, parallel pipe runs are also generally known.

Every Coriolis flowmeter is based on the following physical principle:

An excitation unit produces a periodic harmonic oscillation which is used to excite the measurement tube. The oscillations, which are detected by sensors, at the inlet and outlet points are in the same phase. When flowing through the measurement tube, the fluid mass experiences accelerated oscillation diffractions, which produce a Coriolis force. The originally harmonic oscillation of the measurement tube is therefore influenced by the Coriolis force, which is distributed along the measurement tube, causing a phase shift at the inlet and outlet points. The oscillation phases and oscillation amplitudes at the inlet and outlet points are recorded using sensors, and are passed to an electronic evaluation unit. The magnitude of the phase shift is a measure of the mass flowrate.

Every Coriolis flowmeter is calibrated in order to determine the relationship between the phase shift and the mass flowrate. Calibration means that calibration constants for the measurement instrument are determined under defined conditions, such as a defined temperature, flowrate, etc, and these calibration constants are applied when calculating the mass flowrate from the measured phase shift. The calibration constants are particularly dependent on the pressure within the measurement tube. Pressure within the measurement tube may be a static pressure, that means a pressure under the static condition that the fluid within the measurement tube has zero flowrate. Pressure within the measurement tube may, however, also mean the dynamic pressure when the fluid is flowing with a flowrate other that zero.

The magnitude of the phase shift is dependent on the spring stiffness and the mass of the pipe run. The spring stiffness is in turn dependent on the pipe geometry; in particular the wall thickness, as well as the material characteristics. As long as the material characteristics and the pipe geometry remain unchanged, the calibration that is carried out remains valid, that is to say accurate measured values are achieved. However, if the geometry of the measurement tube—for example the wall thickness—decreases as a result of wear or increases as a result of deposits, incorrect measured values are emitted. A further disadvantage is the increase in the material fatigue over the course of the life, which can become critical, in particular as a result of a reduction in the wall thickness, and in the extreme causes component failures in the form of fatigue fractures. Fatigue fractures such as these are caused by the measurement medium being pressurized, resulting in a corresponding stress on the measurement tube wall.

In order to solve this problem, proposals have been made in the said prior art for the excitation unit to emit a single oscillation pulse to the measurement tube, whose oscillation response is detected by sensors, from which the downstream evaluation unit—in addition to determining the mass flowrate—also calculates the instantaneous damping constant of the measurement tube, and compares this with a stored original damping constant for the measurement tube when new, with the comparison result being used to provide signal-processing compensation for the measurement accuracy.

This has the disadvantage that this measure allows the instantaneous wear state of the measurement tube to be determined only at periodic time intervals, for which purpose normal measurement operation of the flowmeter must be interrupted. This leads to correspondingly increased maintenance effort.

SUMMARY OF THE INVENTION

The object of the present invention is therefore to provide a method and a device for compensation for influences which interfere with the measurement accuracy in measurement devices of the vibration type, which operates during normal measurement operation and can be carried out using simple technical means. It is a further object of the present invention to provide an improved measurement device of the vibration type.

The invention includes the method teaching that the material strain in the measurement tube is detected by means of at least one additional sensor, from which an indicator value for the influence causing the material strain is calculated in order to correct the measurement signal, by signal processing, from the indicator value obtained in this way.

In a preferred embodiment of the present invention the material strain resulting from the medium within the measurement tube is detected by means of at least one sensor for compensation for pressure influences, which interfere with the measurement accuracy. From the sensor signal the pressure causing the material strain is calculated in order to correct the measurement signal, by signal processing, from the pressure value obtained in this way.

In a further preferred embodiment of the invention the material strain in the measurement tube is detected by means of at least one sensor for compensation of changes in the wall thickness of the measurement tube, which interfere with the measurement accuracy. From the sensor signal an indicator value for the change in the wall thickness is calculated in order to correct the measurement signal, by signal processing, from the indicator value obtained in this way.

In a further preferred embodiment the detection of the strain for compensation of changes in the wall thickness of the measurement tube, which interfere with the measurement accuracy, is carried out in static operation conditions when the flowrate through the measurement tube is zero.

In a further preferred embodiment the material strain in the measurement tube is detected by means of at least one sensor for compensation of material deposits on the inner wall of the measurement tube, which interfere with the measurement accuracy. From the sensor signal an indicator value for the amount of deposits on the inner wall of the measurement tube is calculated in order to correct the measurement signal, by signal processing, from the indicator value obtained in this way.

The advantage of the solution according to the invention is, in particular, that the measured value can be compensated for disturbance influences during operation of the flowmeter. The material strain of the measurement tube can be detected by sensors which do not project into the measurement tube and therefore do not form an additional wear point.

The solution according to the invention allows additional process parameters and operating conditions to be obtained using simple technical means, in order to ensure the measurement accuracy of the flowmeter over a long time period, without any maintenance measures.

The material strain is preferably detected on the measurement tube outer wall. In particular, a strain gauge or a combination of a plurality of strain gauges at one measurement point are suitable for this purpose, being fitted to the measurement tube outer wall. The strain gauges should preferably be fitted to the measurement tube in the circumferential direction, since the material strain in this direction is particularly great, much greater than in the longitudinal direction of the measurement tube, so that this specific arrangement allows the sensor to produce particularly useful measurement results. As an alternative to this, the sensor for detection of the strain may also be in the form of a piezo sensor, which is likewise fitted to the measurement tube outer wall, for example by adhesive bonding or brazing.

One or more sensors for measurement of the material strain can be provided on the measurement tube outer wall within the scope of the present invention. If only one sensor is used, the pressure caused by the medium flow is determined as the absolute pressure from the strain measurement. It is also feasible to provide a plurality of such sensors determining the absolute pressure on the measurement tube. The average material strain can be detected by averaging. However, it is also advantageous to use a plurality of sensors such as these to determine the point of maximum material strain on the measurement tube, in particular in order to avoid fatigue fractures.

In addition, the solution according to the invention can also make use of a differential pressure measurement. The pressure caused by the medium flow can be determined for this purpose from the strain measurement at at least two points, arranged at a distance from one another, on the measurement tube. The differential pressure may advantageously be used to calculate further process parameters.

By way of example, the differential pressure and an appliance-specific pressure-loss equation can also be used to calculate the viscosity of the medium flowing through it, on the basis of well-known physical relationships.

The pressure loss equation:

$$\Delta p = \lambda \cdot l/d_i \cdot p/2 \cdot v^2 + \Sigma(\zeta_n \cdot p/2 \cdot v_n^2)$$

is a function of the pipe geometry, surface roughness, viscosity of the measurement medium and a range of hydraulic parameters, where $\lambda$=pipe friction factor, l=pipe length, p=medium density, v=flow velocity,=pressure loss coefficient for hydraulic resistances, n=number of resistances. $\lambda$ and $\zeta$ are nondimensional variables which depend on the Reynolds number and are therefore dependent on the viscosity. By solving the abovementioned equation for the viscosity, this can be determined from the pressure difference $\Delta p$.

In addition, the critical strain which results from the wear-dependent decrease in the wall thickness of the measurement tube can be calculated from the material strain determined by the sensors. This is dependent on the material of the measurement tube, and can be stored as a limit value in the evaluation unit. When this limit value is reached then, for example, an appropriate alarm signal can be emitted.

In addition, it is also possible to use the material strain determined by the sensors to calculate a characteristic value for the amount of deposits on the inner wall of the measurement tube when the flowmeter is being used in conjunction with measurement media which cause deposits on the inner wall of the pipelines. Deposits such as these reduce the material strain of the measurement tube, and make the oscillation characteristics of the measurement tube worse. This phenomenon can be compensated for by signal processing, up to a certain extent. Once a limit value is reached, the flowmeter requires servicing. Since the material strain of the measurement tube that is the focus of the present invention is also a function of the temperature, temperature compensation is also feasible.

BRIEF DESCRIPTION OF THE DRAWINGS

Further measures which improve the invention will be explained in more detail in the following text together with the description of two preferred exemplary embodiments of the invention, with reference to the figures.

DESCRIPTION OF THE EXEMPLARY EMBODIMENTS

Figure 1:
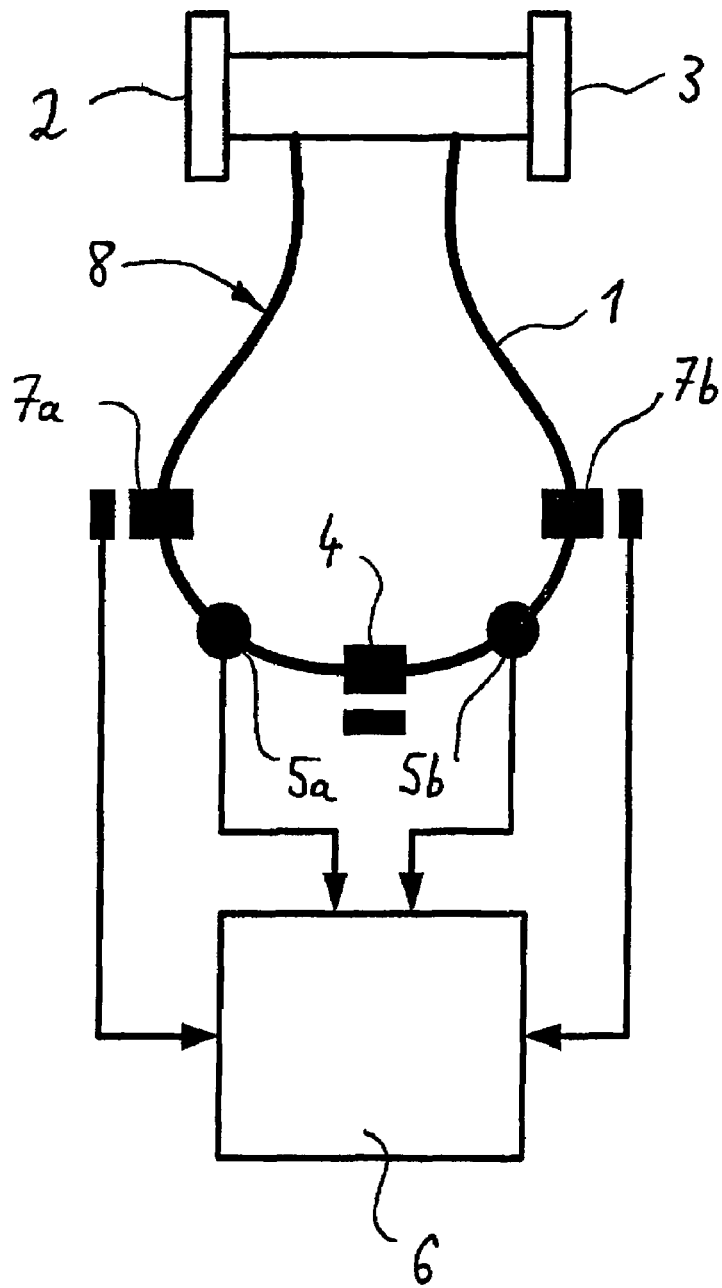
FIG. 1 shows a block diagram of a device for compensation for pressure influences, which interfere with the measurement accuracy, in a Coriolis flowmeter with a bent measurement tube.
Figure 2:
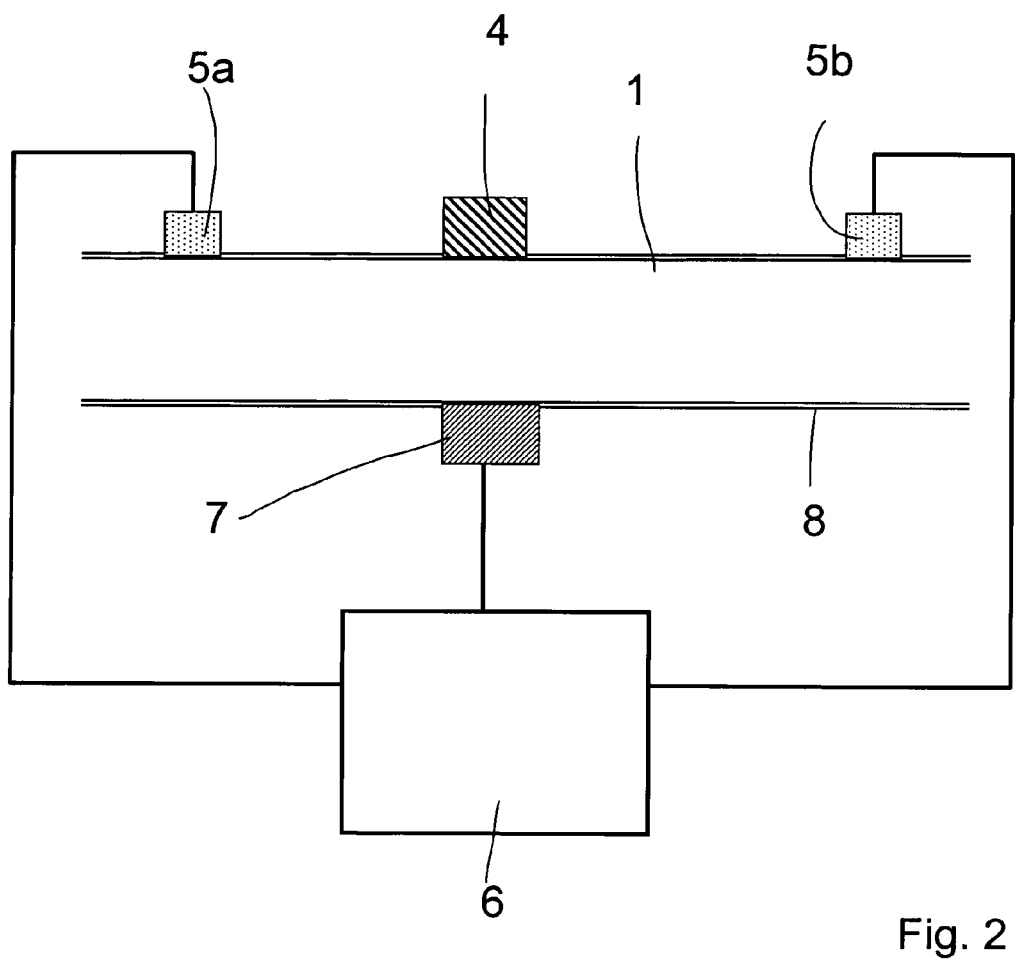
FIG. 2 shows a block diagram of a device for compensation for pressure influences, which interfere with the measurement accuracy, in a Coriolis flowmeter with a single straight measurement tube.

Sub-assemblies, components or elements, which the same or alike or function in an equivalent manner are designated with the same reference signs in FIGS. 1 and 2.

As shown in FIG. 1, the Coriolis flowmeter essentially comprises a measurement tube 1 through which a mass flows and which in this exemplary embodiment is in the form of a Ω. A measurement medium flows through the measurement tube, passing through the measurement appliance, and in this case through the measurement tube 1 as well, via the inlet flange 2 and the outlet flange 3.

The measurement tube 1 is caused to oscillate mechanically by an electromagnetic excitation unit 4. In this case, the excitation unit 4 is positioned in the area of the greatest oscillation amplitude of the measurement tube 1. Inductive sensors 5a and 5b are arranged adjacent to it and on both sides of it, and detect the oscillation behavior of the measurement tube 1, which changes as a result of the medium flow. The sensor signals are supplied to the input side of an electronic evaluation unit 6, which uses the detected sensor values to calculate the mass flowrate and other operating parameters of the Coriolis flowmeter, on the basis of well-known physical relationships.

In addition, the signals from further sensors 7a and 7b, which are fitted at a distance from one another on the measurement tube 1, are supplied to the input side of the evaluation unit 6. The sensors 7a and 7b in this exemplary embodiment are in the form of strain gauges, which are adhesively bonded to the measurement tube outer wall 8 in the circumferential direction. The sensors 7a and 7b determine the material strain of the measurement tube 1 caused by the pressure of the medium inside the measurement tube. The pressure can form resulting from the medium flow through the measurement tube, or as a static pressure when the medium in the tube has zero flow.

The evaluation unit 6 calculates the pressure causing the material strain, in order to correct the measurement signal, by signal processing, from the pressure value obtained in this way. The measurement signal correction is used to compensate for measurement inaccuracies caused by disturbing pressure influences on the measurement behavior of the Coriolis flowmeter. Furthermore, the two sensors 7a and 7b can also be used to determine the differential pressure resulting from the pressure drop between the measurement points, thus allowing further process parameters to be determined, such as the viscosity and the like, by signal processing.

The evaluation unit 6 can as well calculate an indicator value for the change in the wall thickness of the wall 8 of the measurement tube 1 from the material strain, in order to correct the measurement signal, by signal processing, from the indicator value obtained in this way. The measurement signal correction is used to compensate for measurement inaccuracies caused by changes in the wall thickness. During operation of the Coriolis Mass flow meter the wall thickness can change by abrasion or due to corrosion, for example.

Preferably the change in wall thickness is detected in the static state, when the fluid in the measurement tube has zero flow. A decrease in wall thickness can be deduced in the static state from an increase in the material strain.

Furthermore, the evaluation unit 6 can calculate an indicator value for the amount of deposits on the inner wall of the measurement tube 1 from the material strain, in order to correct the measurement signal, by signal processing, from the indicator value obtained in this way. The measurement signal correction is used to compensate for measurement inaccuracies caused by deposits on the inner wall of the measurement tube 1.

Furthermore, the evaluation unit 6 can calculate an indicator value for the temperature of the measurement tube 1 from the material strain, in order to correct the measurement signal, by signal processing, from the indicator value obtained in this way. The measurement signal correction is used to compensate for measurement inaccuracies caused by temperature changes of the measurement tube 1.

The Coriolis mass flow meter shown in FIG. 2 has a single straight measurement tube 1. It is caused to oscillate mechanically by an excitation unit 4. In this case the excitation unit 4 is positioned approximately in the middle of the measurement tube. Oscillation sensors 5a and 5b are arranged adjacent and on both sides of it and detect the oscillation behavior of the measurement tube. Opposite to the excitation unit 4 a strain gauge 7 is arranged adjacent to the measurement tube wall 8. It is adhesively bonded to the wall 8 of the measurement tube 1 in the circumferential direction. The sensor 7 determines the material strain of the measurement tube 1 which is caused by the pressure of the fluid medium inside the measurement tube 1, or which is caused by changes of the wall thickness of the tube wall 8, or which is caused by deposits on the inner wall of the measurement tube 1, or which is caused by temperature changes, in order to correct the measurement signal, by signal processing, as described above.

The invention is not restricted to the preferred exemplary embodiment described above. In fact, modifications of it are also feasible, and these are covered by the scope of protection of the subsequent claims. For example, it is also possible to use the solution according to the invention in conjunction with multiple straight measurement tubes or measurement tubes with different forms. Other strain sensors, such as piezo sensors, can also be used instead of strain gauges, and are preferably fitted to the outside of the measurement tube. The invention can also be implemented as a minimal solution, by means of an absolute pressure measurement using only one sensor.

| List of reference symbols | |
|---|---|
| 1 | Measurement tube |
| 2 | Inlet flange |
| 3 | Outlet flange |
| 4 | Excitation unit |
| 5a, 5b | Oscillation sensor |
| 6 | Evaluation unit |
| 7, 7a, 7b | Sensor |
| 8 | Measurement tube outer wall |

The invention claimed is:

1. A method for correcting a measurement signal by compensating for influences, which interfere with accuracy of the measurement signal, in measurement devices of the vibration type, comprising a measurement tube through which a fluid medium can flow and which is caused to oscillate mechanically, acting as an oscillation body, by an excitation unit, whose oscillation behavior, which changes as a function of flowrate, viscosity or density of the fluid medium, is detected by at least one oscillation sensor in order to determine the flowrate, the viscosity or the density of the fluid medium, wherein an indicator value for an influence causing a material strain in the measurement tube is calculated from the material strain in circumferential direction of the measurement tube by means of at least one sensor, in order to correct the measurement signal, using signal processing, from the indicator value by compensating for inaccuracy of the measurement signal caused by the influence.

2. The method as claimed in claim 1, wherein, for compensation for pressure influences, which interfere with the measurement accuracy, the material strain resulting from the medium within the measurement tube is detected by means of at least one sensor ,from which the pressure causing the material strain is calculated in order to correct the measurement signal, by signal processing, from the pressure value obtained in this way.

3. The method as claimed in claim 1, wherein for compensation of changes in the wall thickness of the measurement tube, which interfere with the measurement accuracy, the material strain in the measurement tube is detected by means of at least one sensor, from which an indicator value for the change in the wall thickness is calculated in order to correct the measurement signal, by signal processing, from the indicator value obtained in this way.

4. The method as claimed in claim 3, wherein the detection of the strain for compensation of changes in the wall thickness of the measurement tube, which interfere with the measurement accuracy, is carried out in static operation conditions when the flowrate through the measurement tube is zero.

5. The method as claimed in claim 1, wherein for compensation of material deposits on the inner wall of the measurement tube, which interfere with the measurement accuracy, the material strain in the measurement tube is detected by means of at least one sensor, from which an indicator value for the amount of deposits on the inner wall of the measurement tube is calculated in order to correct the measurement signal, by signal processing, from the indicator value obtained in this way.

6. The method as claimed in claim 1, wherein the material strain is detected on the measurement tube outer wall.

7. The method as claimed in claim 2, wherein the pressure caused by the fluid medium is determined as an absolute pressure from the strain measurement at at least one point on the measurement tube.

8. The method as claimed in claim 2, wherein the pressure caused by the fluid medium is determined as a differential pressure from the strain measurement at at least two points on the measurement tube.

9. The method as claimed in claim 8, wherein the viscosity of the medium flowing through the measurement tube is calculated from the differential pressure and an appliance-specific pressure-loss equation.

10. The method as claimed claim 3, wherein the critical strain which results from the wear-dependent decrease in the wall thickness of the measurement tube is calculated from the material strain determined by the sensors.

11. The method as claimed claim 5, wherein a characteristic value for the amount of deposits on the inner wall of the measurement tube is calculated from the material strain determined by the sensors.

12. A measurement device of the vibration type, having at least one measurement tube, through which a fluid medium can flow and which can be caused to oscillate mechanically by means of an excitation unit, as an oscillation body, whose oscillation behavior, which changes as a function of flowrate, viscosity or density of the fluid medium, can be detected by at least one sensor in order to determine the flowrate, the viscosity, or the density of the fluid medium, and having a device for compensation for influences which interfere with the measurement accuracy, wherein at least one evaluation unit is provided in order to calculate an indicator value for an influence causing a material strain in the measurement tube and to correct measurement signal by compensating for inaccuracy of the measurement signal caused by the influence, using signal processing, from the indicator value, and at least one sensor is provided in order to detect the material strain in the measurement tube.

13. The measurement device as claimed in claim 12, wherein for compensation for pressure influences, which interfere with the measurement accuracy, at least one sensor is provided in order to detect the material strain resulting from the medium within the measurement tube, and at least one evaluation unit is provided in order to calculate the pressure causing the material strain and to correct the measurement signal, by signal processing, from the pressure value obtained in this way.

14. The measurement device as claimed in claim 12, wherein for compensation of changes in the wall thickness of the measurement tube, which interfere with the measurement accuracy, at least one sensor is provided in order to detect the material strain in the measurement tube, and at least one evaluation unit is provided in order to calculate an indicator value for the change in the wall thickness and to correct the measurement signal, by signal processing, from the indicator value obtained in this way.

15. The measurement device as claimed in claim 12, wherein for compensation of material deposits on the inner wall of the measurement tube, which interfere with the measurement accuracy, at least one sensor is provided in order to detect the material strain in the measurement tube, and at least one evaluation unit is provided in order to calculate an indicator value for the amount of deposits on the inner wall of the measurement tube in order to correct the measurement signal, by signal processing, from the indicator value obtained in this way.

16. The measurement device as claimed in claim 13, wherein a sensor is provided in order to determine the absolute pressure from the strain measurement at at least one point on the measurement tube.

17. The measurement device as claimed in claim 13, wherein a plurality of sensors are provided in order to determine the differential pressure from the strain measurement at at least two points on the measurement tube.

18. The measurement device as claimed in claim 13, wherein the at least one sensor is in the form of a piezo sensor which is fitted to the measurement tube outer wall.

19. The measurement device as claimed in claim 13, wherein the at least one sensor is in the form of a strain gauge, which is fitted to the measurement tube outer wall.

20. The measurement device as claimed in claim 19, wherein the strain gauge is fitted to the measurement tube in the circumferential direction.

21. A device for compensation for influences which interfere with the measurement accuracy of measurement devices of the vibration type, which have at least one measurement tube, through which a fluid medium can flow and which can be caused to oscillate mechanically by means of an excitation unit, as an oscillation body, whose oscillation behavior, which changes as a function of flowrate, viscosity, or density of the fluid medium, can be detected by at least one sensor in order to determine the flowrate, the viscosity, or the density of the fluid medium, wherein at least one evaluation unit is provided in order to calculate an indicator value for an influence causing the material strain and to correct measurement signal by compensating for inaccuracy of the measurement signal caused by the influence, by signal processing, from the indicator value, and wherein at least one sensor is provided in order to detect the material strain in circumferential direction of the measurement tube.

22. The device as claimed in claim 21, wherein for compensation for pressure influences, which interfere with the measurement accuracy, at least one sensor is provided in order to detect the material strain resulting from the medium within the measurement tube, and at least one evaluation unit is provided in order to calculate the pressure causing the material strain and to correct the measurement signal, by signal processing, from the pressure value obtained in this way.

23. The device as claimed in claim 21, wherein for compensation of changes in the wall thickness of the measurement tube, which interfere with the measurement accuracy, at least one sensor is provided in order to detect the material strain in the measurement tube, and at least one evaluation unit is provided in order to calculate an indicator value for the change in the wall thickness and to correct the measurement signal, by signal processing, from the indicator value obtained in this way.

24. The device as claimed in claim 21, wherein for compensation of material deposits on the inner wall of the measurement tube, which interfere with the measurement accuracy, at least one sensor is provided in order to detect the material strain in the measurement tube, and at least one evaluation unit is provided in order to calculate an indicator value for the amount of deposits on the inner wall of the measurement tube in order to correct the measurement signal, by signal processing, from the indicator value obtained in this way.

25. The device as claimed in claim 22, wherein a sensor is provided in order to determine the absolute pressure from the strain measurement at at least one point on the measurement tube.

26. The device as claimed in claim 22, wherein a plurality of sensors are provided in order to determine the differential pressure from the strain measurement at at least two points on the measurement tube.

27. The device as claimed in claim 22, wherein the at least one sensor is in the form of a piezo sensor which is fitted to the measurement tube outer wall.

28. The device as claimed in claim 22, wherein the at least one sensor is in the form of a strain gauge, which is fitted to the measurement tube outer wall.

29. The device as claimed in claim 28, wherein the strain gauge is fitted to the measurement tube in the circumferential direction.

* * * * *